(12) United States Patent
Keyson

(10) Patent No.: US 6,943,775 B1
(45) Date of Patent: Sep. 13, 2005

(54) INFORMATION PROCESSING SYSTEM

(75) Inventor: David V. Keyson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 957 days.

(21) Appl. No.: 09/119,887

(22) Filed: Jul. 21, 1998

(30) Foreign Application Priority Data

Jul. 21, 1997 (EP) .......................................... 97202277

(51) Int. Cl.[7] .............................................. G09G 5/08
(52) U.S. Cl. ........................ 345/163; 345/156; 345/167
(58) Field of Search ................................. 345/156–184, 345/200.53

(56) References Cited

U.S. PATENT DOCUMENTS

| | | | | |
|---|---|---|---|---|
| 4,868,549 A | * | 9/1989 | Affinito et al. ............ | 345/164 |
| 5,739,811 A | * | 4/1998 | Rosenberg et al. ......... | 345/161 |
| 5,749,908 A | * | 5/1998 | Snell .......................... | 607/30 |
| 5,929,846 A | * | 7/1999 | Rosenberg et al. ......... | 345/161 |
| 5,956,484 A | * | 9/1999 | Rosenberg et al. ..... | 345/200.53 |

OTHER PUBLICATIONS

"cc:Mail for Windows, Version 2.2", Philips Communication and Processing Services, B.V. 1996, pp 1–83.

* cited by examiner

*Primary Examiner*—Sumati Lefkowitz
*Assistant Examiner*—Srilakshmi K. Kumar
(74) *Attorney, Agent, or Firm*—Gregory L. Thorne

(57) ABSTRACT

An information processing system comprises a plurality of information objects. The system has an input device through which a user can select a particular information object to be processed. An information object has an object representation to allow selection of the information object by the user. The user selects a particular information object on the basis of attributes of the corresponding object representation. In the processing system according to the invention, the object representation has a tactual attribute representative of that object representation and the input device is operative to provide the user with a tactile stimulation on the basis of this tactual attribute.

8 Claims, 2 Drawing Sheets

INFORMATION PROCESSING SYSTEM

BACKGROUND OF THE INVENTION

The invention relates to an information processing system for handling a plurality of information objects, an information object having an object representation including one or more object attributes, the system comprising an input device allowing a user to select a particular information object through the object representation of the information object, and processing means for processing the selected information object.

The invention further relates to a method for processing a particular information object in an information processing system comprising a plurality of information objects, an information object having an object representation including one or more object attributes, the method comprising the steps of:

selecting, by a user by means of an input device, the particular information object on the basis of at least one of the object attributes, and processing the selected information object.

An example of such an information processing system is a Personal Computer equipped with the e-mail system 'cc:Mail for Windows, Version 2.2'. This system processes information objects, referred to as messages, in various ways. The user may choose to read a newly received message that is displayed by the system, and the system will subsequently display the contents of the message. In that system a message is represented by a line of text, including the name of the author, the date, the size and the subject of the message. The user selects a message by moving an indicator to the representation of the message and by subsequently confirming that this message is desired. The selection is carried out by means of the input device of the system, e.g. a mouse, whereby a pointing arrow directly follows the movements of the mouse and the confirmation is given through a button on the mouse. In addition to messages, the e-mail system comprises containers, referred to as folders, for storing messages. A folder can hold a number of messages and is represented by an icon symbolising the folder in a graphical way. The user may store a message in a folder by first selecting a message and then specifying in which folder the message has to be stored. Alternatively, the message may be transferred to a desired folder through a so-called 'drag and drop' mechanism. To this end, the user moves the pointing arrow to the representation of the relevant message and selects this message by pressing the mouse button. Then, while pressing the button, the user moves the pointing arrow with the 'attached' representation of the message to the desired folder and releases the button when the representation of the message is above the icon of the folder. The system then stores the selected message in that folder. In addition to folders made available by the system, the user may create his own folders so that he can store the messages in folders according to a suitable classification.

In the known system, a message is represented by a line of text on a display. Selecting a particular message that is to be processed, from a number of available messages requires a careful inspection of the representations of these messages in order to determine which one is to be selected. This is especially true if there are a lot of available messages, e.g. the newly received messages during the past days and the more urgent ones must be handled first. When it is established what message is to be selected, the user has to manipulate the input device in such a way that the desired message is actually selected.

SUMMARY OF THE INVENTION

It is an object of the invention to provide an information processing system of the kind set forth, in which the selection of an information object is improved relative to the selection in the known system. This object is achieved according to the invention in an information processing system that is characterised in that the object representation includes a tactual object attribute representative of that object representation, and that the input device is operative to provide the user with a tactile stimulation on the basis of the tactual object attribute. Because of the tactile stimulation on the basis of the tactual object attribute, the user receives the discriminating information required to decide on the selection of a particular information object in a direct way. There is no need for a visual inspection of displayed object representations. A further advantage is that the discriminating information is received by the user via the same sensory channel as that used to manipulate the input device and to execute the selection. This improves the selection process since there is no longer a step of visual presentation and interpretation of the manipulation of the input device. The manipulation and the result of it are directly linked. The user immediately feels the results of a manipulation and need not interpret the results in a separate step. Furthermore, according to the invention, the user is able to select an information object while looking at another part of the display if this also requires his attention.

Application of the invention is not restricted to the above-described e-mail system. Many computer applications in business and technical environments involve a system in which a user selects an information object which is subsequently processed by the system. An information object in such a system can be a file comprising data on a piece of work, like a drawing or a document, or an executable program for carrying out a certain task. In such a system an object is traditionally represented by an icon on a display which can be selected by the user. The input device for selecting an information object can be realised in many ways. It may be for example a mouse, a joystick, a track ball or a touch pad. The input device according to the invention allows the selection of an information object, i.e. moving around between the object representations and clicking the desired one, and allows giving a tactile stimulation to the user. An example thereof is a track ball equipped with one or more motors capable of sending a vibration through the ball which can be sensed by the user. An example of a general application in which the invention can be employed is the organisation of files across directories on a disk of a computer. A directory holds a number of files according to some characteristic and functions as a container of the files. The user may manipulate the files in many ways, e.g. storing, copying and moving files, whereby the directories serve as containers for the files. To enable selection of a particular file from a number of files, the user receives, through the input device, a tactile stimulation which is representative of the particular file. The perceived tactile stimulation may be unique for a given file or may be the same for a group of files, thus being representative of that group of files.

An embodiment of the information processing system according to the invention is defined in claim 2. This system is embodied so that the user avails of the same support for selecting a container as for selecting an information object.

In both cases, the user can receive a tactile stimulation representative of the object or container under consideration. This allows the information object and the container to be compared by simply comparing the tactile object attribute with the tactile container attribute.

An embodiment of the information processing system according to the invention is defined in claim 3. By having the processing means of the system select the container, the user is further supported in the selection process. In this embodiment, the user may accept the suggested selection by the system or the user may override this selection and select a different container An embodiment of the information processing system according to the invention is defined in claim 4. By providing a tactile stimulation on the basis of the force attracting the object representation towards the container representation, the user is supported in the actual movement of the object representation. The user is presented with a continuous force that tries to pull the object representation into the container representation. This force guides the user when moving the object representation towards the container representation. This mechanism is particularly useful when the processing means have selected a container, while the user decides that the selected object should be stored in a different container. The user then feels the system pulling the object representation towards the container representation of the container selected by the system, but moves the object representation against the pulling force towards the container representation of the container of his choice. It is advantageous that the information supporting the selection of an object, i.e. the tactile stimulation based on the tactual object attribute, is presented to the user through the same channel as the information informing the user about the system's selection, i.e. the pulling force towards the container representation.

An embodiment of the information processing system according to the invention is defined in claim 5. This prevents interference between the tactile stimulation presenting the force on the object representation towards the container representation of the selected container and the tactile stimulation presenting the tactile attributes of other container representations.

It is a further object of the invention to provide a method of the kind set forth with an improved selection of the information object as compared to the known method. This object is achieved according to the invention in a method which is characterised in that selection of the information object is carried out on the basis of a tactual attribute of the object representation provided to the user as a tactile stimulation by means of the input device. The tactile stimulation based on the tactual attribute of the object representation allows the user to decide on the selection of an information object in a way that does not require visual attention. The tactile stimulation provides information that is characteristic of the object representation. This may be an identification that is unique to the particular object representation or an identification indicating the kind of object representation, i.e. unique to a class of object representations. Since the selection according to the invention does not require visual attention, the user may select the information object and simultaneously look at something else. This may be a portion of the display, if present in the system, or something completely outside the system, e.g. a paper document on the desk.

Further advantageous embodiments of the invention are recited in dependent claims.

BRIEF DESCRIPTION OF THE DRAWINGS

The invention and its attendant advantages will be further elucidated with the aid of exemplary embodiments and the accompanying schematic drawings, in which.

Corresponding features in the various Figures are denoted by the same reference symbols.

DESCRIPTION OF THE PREFERRED EMBODIMENTS

Figure 1:
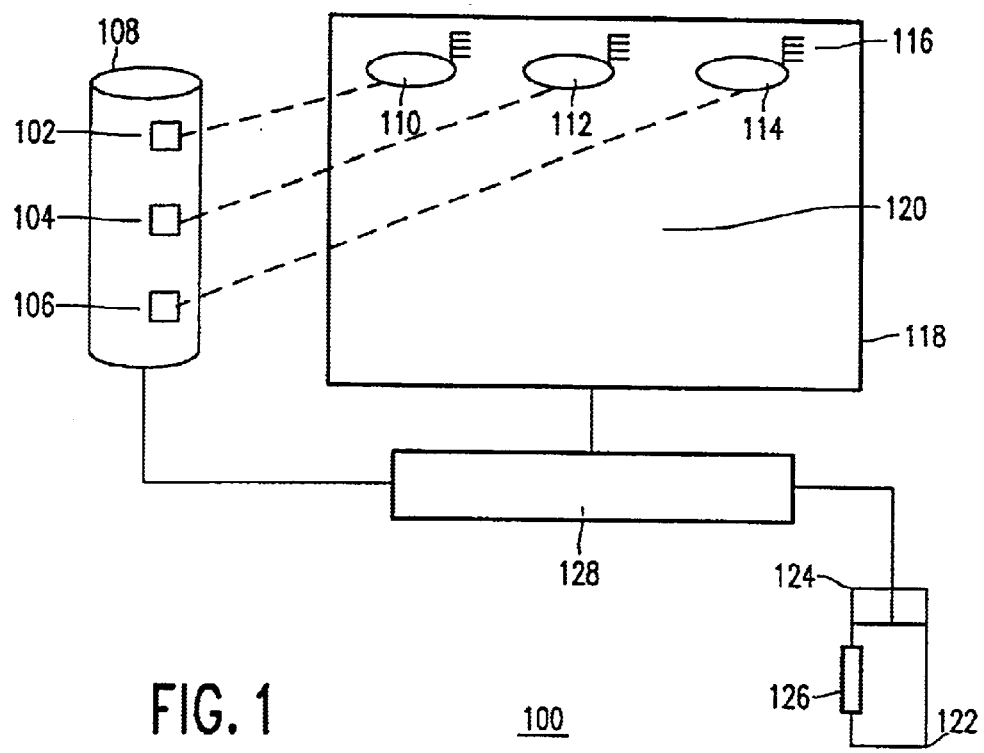
FIG. 1 schematically shows an information processing system according to the invention, FIG. 2 schematically shows an alternative embodiment of the information processing system according to the invention.

FIG. 1 schematically shows an information processing system according to the invention. The information processing system 100 comprises information objects 102, 104 and 106 which reside on a suitable storage medium 108. The information objects have respective object representations 110, 112 and 114. The object representation fulfils the function of interface between the corresponding information object and a user of the system. The object representation is used to characterise the information object and to select the information object. An object representation has object attributes, symbolised by attribute list 116, describing the object. Various types of object attributes are feasible and some are given in the following list:

a textual name of the object,
a textual description of the type of object,
a colour of a symbol of the object,
an image symbolising the object, and
a sound characterising the object.

In the information processing system according to the invention, at least one of the object attributes is a tactual attribute. Such a tactual object attribute allows the user to feel the information object. The system 100 may be provided with a display 118 for displaying the object representation. However, since according to the invention an object representation has a tactual object attribute through which it may be felt by the user, the display could be dispensed with. In case the system has a display, the object representations may be displayed in a transparent or dimmed fashion, which allows the user to still clearly see the original contents 120 on the display. This can be employed when the user watches a TV program on the display, while object representations are presented to which the user can react. This may be for example the handling of incoming messages while watching a program, adjusting the controls of the TV set while watching the program, and programming the VCR to record a program while watching the current program.

The information processing system 100 further comprises an input device 122 allowing the user of the system to select a particular information object. The input device is arranged to indicate that one of the object representations is desired and to give a confirmation actually making the selection. Furthermore, the input device according to the invention is arranged to provide the user with a tactile stimulation on the basis of a tactual object attribute. In the example of FIG. 1, the input device is employed as the traditional mouse, i.e. movements with respect to a supporting surface make an indicator on the display move accordingly. The input device 122 has a button 124 for confirmation of the selection and a stimulation element 126 for providing the user with the sense of feeling the object representation. The stimulation element can be embodied so as to be a member vibrating at a frequency corresponding to the value of the tactual object attribute of the indicated object representation. In another embodiment, described below, the input device according to the invention takes the form of a track ball in which the stimulation is provided to the user through a vibration of the ball itself. The information processing system 100 further comprises processing means 128 for processing the selected information object in a given manner. The nature of the processing operation is not relevant to the system according to the invention. Some examples are:

deleting a selected file from a directory, printing a selected document, reading a selected electronic message, and starting a selected function of the system.

The processing means are responsive to the selection by means of the input device 122 and are arranged to access the selected information object from the storage medium 108.

Figure 2:
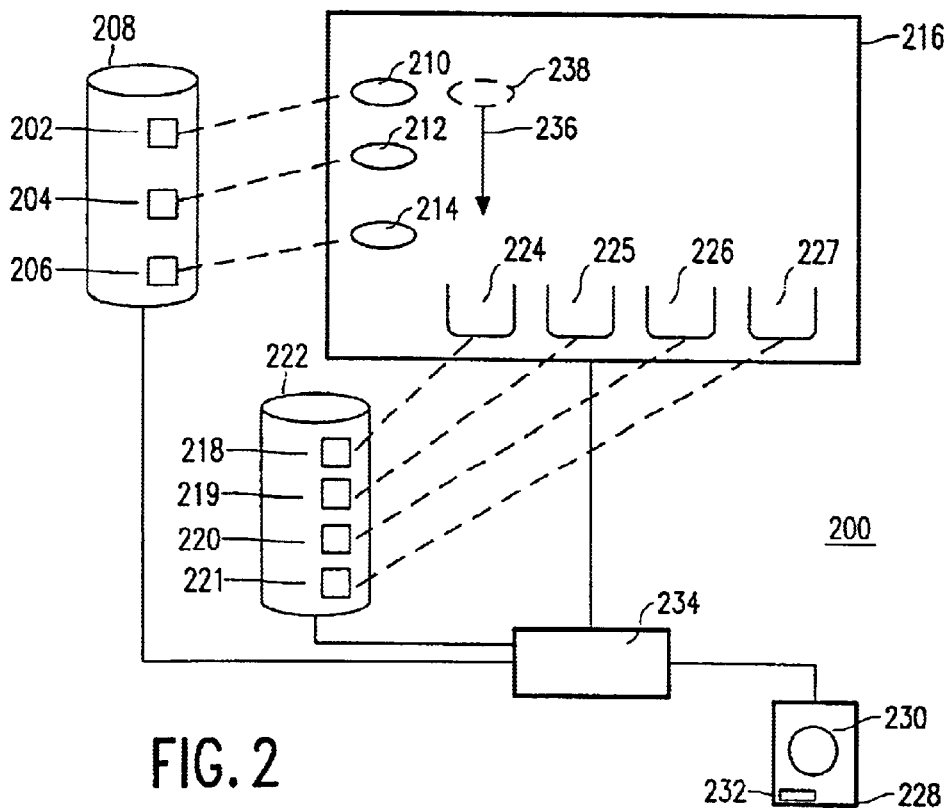

FIG. 2 schematically shows an alternative embodiment of the information processing system according to the invention. The system 200 comprises electronic messages 202, 204 and 206 as information objects stored on a storage medium 208. The messages have respective object representations 210, 212 and 214, which may be displayed on a display 216. An object representation has one or more object attributes, including a tactual object attribute, characterising the corresponding message. The system 200 further comprises containers 218, 219, 220 and 221 stored on a storage medium 222. Storage medium 222 may be the same as storage medium 208. The containers have respective container representations 224, 225, 226 and 227, which may be displayed on the display 216. A container representation has one or more container attributes, including a tactual container attribute. A container of the information processing system is used to store messages, like paper letters, in a folder. The system is equipped with an input device 228, in this embodiment a track ball. The input device 228 has a rotatable ball 230, which can be freely rotated by a user. Rotation of the ball is translated into a corresponding movement of an indicator among the available object representations and container representations. The input device has a button 232 for selecting the indicated object or container. The system further comprises processing means 234 for accessing the messages and the containers upon selection by the input device and for processing the messages. An example of how the messages and the containers in this embodiment are used is given below.

A message has a tactual object attribute that can have one of the three values 'FRIEND', 'COLLEAGUE' and 'OTHER'. These values cause, when the message is indicated by the user, a respective vibration of the ball of the input device. The system may have a table for finding the value of the tactual object attribute of a message on the basis of the sender of the message. Such a table would contain the names of known senders together with an indication whether the sender is a friend, a colleague or some other person. A list of one or more newly arrived messages, like messages 210, 212 and 214, is presented to the user. The value of the tactual object attribute of each of the messages is either 'FRIEND', 'COLLEAGUE' or 'OTHER'. When the user moves the indicator to one of the object representations of the messages, the ball vibrates in a way that corresponds to the respective value. The user can then feel the type of message that is indicated. The system has four containers and four corresponding container representations, whereby a container representation has a tactual container attribute with a respective value from one of the four values 'FRIEND', 'COLLEAGUE', 'OTHER' and 'WASTEBASKET'. So the value of container representation 224 is 'FRIEND', of container representation 225 'COLLEAGUE', of container representation 226 'OTHER' and of container representation 227 'WASTEBASKET'. By indicating a certain container representation, the user feels the value in the same way as described above for a message. Furthermore, when the value of the tactual attribute of a container is the same as that of a message, the user experiences the same feeling for that message and that container. When the user indicates one of the newly received messages, he feels what message it is. The user may then decide, possibly after reading the message, to store the message in the corresponding container. When object representation 210 concerns such a newly received message with a tactual object attribute with a value 'FRIEND', the user moves the indicator to 210 and presses the button. While pressing the button, the user moves the indicated representation into container representation 224 by rotating the track ball.

The system may be embodied so as to generate a force on the track ball that is experienced by the user as a force on the selected object representation towards the corresponding container. In the example above, when object representation 210 is selected to be moved to container representation 224, the system applies a force on ball 230 in such a way that the user experiences a force 236 towards the container representation. While the object representation moving around, symbolized by representation 238, the force 236 keeps pointing towards the container representation 224 and this is perceived by the user as a force field around that container representation attracting the object representation. The user is able to move the object representation in any direction but feels through the force into which of the containers the object representation should be stored. In this way, the message can be moved into the correct container by the system, by simply releasing the button 232 while the object representation is being moved. The force field then pulls the object representation 210 automatically into container representation 224. This enables the user to pick up one of the messages, i.e. one of the object representations, and through a gesture-like movement on the ball of the input device, throw the message into the corresponding container. When the system provides the user with a force as described above, the tactual attributes of object representations and container representation are preferably switched off. Otherwise, a user could receive a mixture of tactual stimulations caused by the applied force and by the tactual attribute of an object representation or container representation. Furthermore, the system may be equipped with an 'auto-arrange' function which automatically stores a number of messages into the corresponding containers, e.g. all newly received messages are stored in the containers according to the type of sender, as described above. If the user selects this function, the system stores the messages according to equivalence between the tactual attribute of the message and that of the container. Furthermore, the system may be equipped with a sort function which orders the objects residing in a container with respect to the value of a tactual attribute of the objects. A number of objects are stored in a container because they meet the criterion for that container, e.g. they all have the same value for the respective tactual object attribute or that value falls within a specific range. Now, the objects in a container may have mutually different values for the tactual object attributes. In that case, execution of the sort function puts the object in an ordered sequence with respect to that value. This may be an ascending order or a descending order.

The system may also be embodied so as to allow the user to assign a value to the tactual attribute of an object representation or to override the value assigned by the system. To this end, the user chooses a certain object representation and moves this to a container representation having a value of the tactual attribute which is desired. Once the object representation is put into that container representation, possibly by moving against a force through which the system tries to put the object representation into another container representation, it inherits the value of the tactual attribute. In this way the user assigns the value of the tactual attribute of the container representation to the tactual attribute of the object representation. The user then labels or re-labels the message according to his needs.

Figure 3:
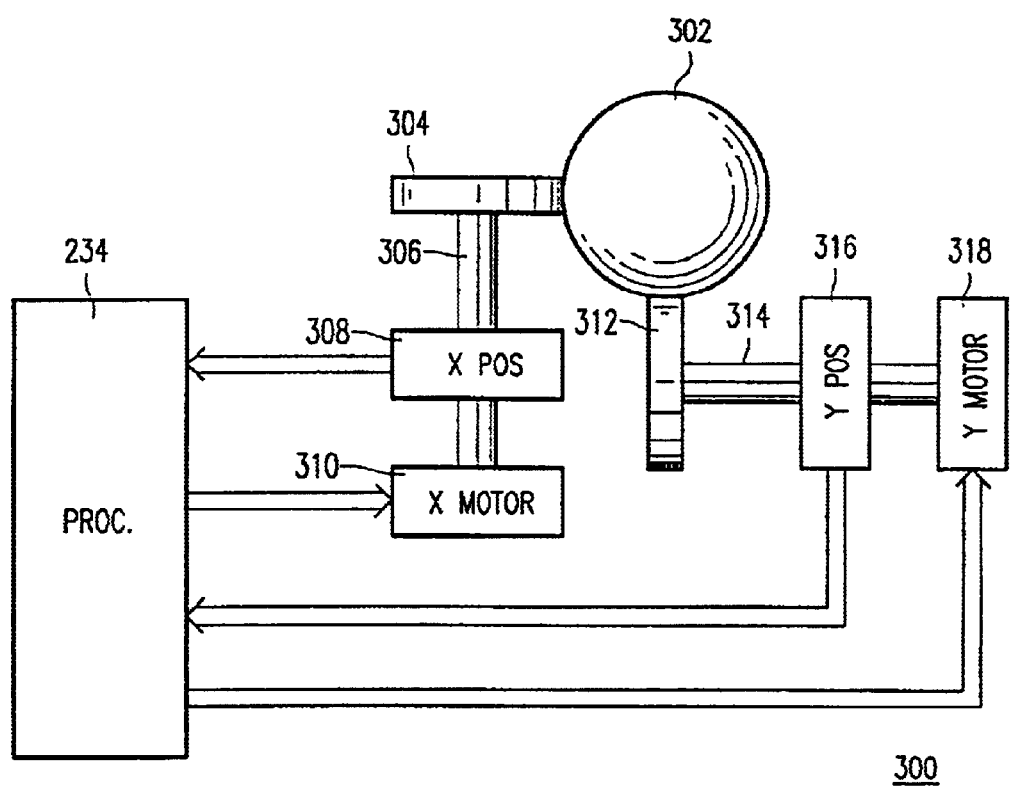
FIG. 3 shows an input device to be used in the information processing system according to the invention.

FIG. 3 shows an input device for use in the information processing system according to the invention. The input device 300 comprises a ball 302 that can be freely rotated by a user. The rotation in a first direction is sensed by a wheel 304 that is friction-coupled to the ball 302. The wheel 304 is mounted on a shaft 306 on which is also mounted a position sensor 308. A rotation of the ball in the first direction causes a rotation of the shaft and is transmitted to the processing means 234 by the sensor 308. The input device furthermore comprises on shaft 306 a motor 310 that is controlled by the processing means in order to drive ball 302 into the first direction. In a similar way, a rotation of the ball in a second direction is transmitted to the processing means via a wheel 312, a shaft 314 and a position sensor 316. A motor 318 is mounted on shaft 314 for driving the ball in the second direction under the control of the processing means. Via the two position sensors 308 and 316, an arbitrary rotation of the ball can be sensed and translated into a movement of an indicator in the system. Via the two motors 310 and 318, the processing means can drive the ball in any rotational direction and the user can be provided with a tactual stimulation in correspondence with the tactual attributes of the object representations and the container representation. Furthermore, the ball can be driven such that the user experiences a force moving the ball in a certain direction, thus giving the user the impression that a selected object representation is attracted towards a certain container representation. The operation and details of the input device according to FIG. 3 are presented in European patent application EP 0 489 469 A1.

What is claimed is:

1. An information processing system for handling a plurality of information objects, an information object having an object representation including one or more object attributes, the system comprising an input device allowing a user to select a particular information object through the object representation of the information object, and processing means for processing the selected information object, characterised in that the object representation includes a tactual object attribute representative of that object representation, and that the input device is operative to provide the user with a tactile stimulation on the basis of the tactual object attribute.

2. An information processing system as claimed in claim 1, comprising a plurality of containers, a container having a container representation including one or more container attributes, wherein the input device is operative to provide the user with a tactile stimulation on the basis of a tactual container attribute, and wherein the processing means are operative to store the selected object in a particular container selected from the plurality of containers.

3. An information processing system as claimed in claim 2, wherein the particular container is selected by the processing means on the basis of a correspondence between the tactual object attribute of the selected information object and the tactual container attribute of the particular container.

4. An information processing system as claimed in claim 2, wherein the processing means are operative to generate a force which is applied to the object representation of the selected information object and directed towards the selected container, which force is to be provided to the user as a tactile stimulation through the input device.

5. An information processing system as claimed in claim 2, wherein the processing means are operative to disable the tactual attributes of the container representations of the non-selected containers so as to avoid a tactile stimulation to the user by those container representations.

6. An information processing system as claimed in claim 2, wherein the processing means are operative to assign a value to the tactual object attribute of the object representation, which value is the same as the value of the tactual container attribute of the container representation of the particular container.

7. An information processing system as claimed in claim 2, wherein the processing means are operative to order objects in a container with respect to the tactual object attribute of the corresponding object representations.

8. A method for processing a particular information object in an information processing system comprising a plurality of information objects, an information object having an object representation including one or more object attributes, the method comprising the steps of:

selecting, by a user by means of an input device, the particular information object on the basis of at least one of the object attributes, and processing the selected information object, characterised in that selecting the information object is carried out on the basis of a tactual attribute of the object representation provided to the user as a tactile stimulation by means of the input device.

* * * * *